(12) United States Patent
Yonemura

(10) Patent No.: US 10,948,757 B2
(45) Date of Patent: Mar. 16, 2021

(54) DISPLAY DEVICE

(71) Applicant: SHARP KABUSHIKI KAISHA, Sakai (JP)

(72) Inventor: Koshu Yonemura, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/807,904

(22) Filed: Mar. 3, 2020

(65) Prior Publication Data
US 2020/0292869 A1   Sep. 17, 2020

(30) Foreign Application Priority Data

Mar. 14, 2019   (JP) .............................. JP2019-046687

(51) Int. Cl.
*G02F 1/1333* (2006.01)
(52) U.S. Cl.
CPC .... *G02F 1/133308* (2013.01); *G02F 1/13332* (2021.01); *G02F 1/133314* (2021.01); *G02F 1/133317* (2021.01)
(58) Field of Classification Search
CPC ............. G02F 1/133308; G02F 1/1333; G02F 1/1335; G02F 1/133528; G02F 1/133615; G02F 1/133524; G02F 1/133606; G02F 1/133608; G02F 1/1336; G02F 2001/133317; G02F 2001/133314; G02F 2001/13332; G02F 2001/133311; G02F 2001/133331; G02F 2202/28
See application file for complete search history.

(56) References Cited

U.S. PATENT DOCUMENTS

2008/0285223 A1* 11/2008 Sugawara ......... G02F 1/133308
361/679.02

FOREIGN PATENT DOCUMENTS

JP    2014-211566 A    11/2014

* cited by examiner

*Primary Examiner* — Thoi V Duong
(74) *Attorney, Agent, or Firm* — ScienBiziP, P.C.

(57) ABSTRACT

A display device to be set in a position at an angle to a horizontal plane includes a display pane, a frame, and a tape. The display panel is configured to display images. The frame includes a frame portion surrounding a display area of the display panel. The tape is disposed between the display panel and the frame portion. The tape includes segments disposed along the frame portion. The segments include a lower segment extending along a lower section of the frame portion including end portions bending toward an upper section of the frame portion when the display device is set at the angle to the horizontal plane.

6 Claims, 7 Drawing Sheets

DISPLAY DEVICE

CROSS REFERENCE TO RELATED APPLICATION

This application claims priority from Japanese Patent Application No. 2019-046687 filed on Mar. 14, 2019. The entire contents of the priority application are incorporated herein by reference.

TECHNICAL FIELD

The technology described herein relates to a display device.

BACKGROUND

A known liquid crystal display device includes a frame for holding a liquid crystal panel configured to display images and a tape disposed between the frame and the liquid crystal panel tape has a shock resistance (cushioning properties). If the liquid crystal display device is a size of 5 inches or larger, the tape includes small rectangular segments that are connected to form, a frame shape along an outline of the liquid crystal panel. The tape prepared by connecting the segments may have an advantage in production cost over the tape that is formed in a frame shape from a signal piece of material.

In the tape prepared by connecting the segments, a gap may be created at a joint between the adjacent segments and a foreign substance may enter through the gap. Especially, if a gap is created in a tape disposed between a liquid crystal panel and a frame (a bezel, a front frame) surround an outer edge sections of a display surface of the liquid crystal panel and a liquid contacts the display surface, the liquid may flows down on the display surface due to the gravity and reach an optical component within the liquid crystal display device via the gap in the tape disposed below the display surface. Because the display surface is exposed, water drops may adhere to the display surface when a person touches the display surface with a wet hand, drops of a cleaner for removing stains may adhere to the display surface, or drinking water may be spilled on the display device through carelessness of a user. If a liquid enters through the gap, optical characteristics may change and variations in image reproduction may occur.

An example of such a liquid crystal display device is disclosed in Japanese Unexamined Patent Application Publication No. 2014-211566. A method of connecting segments of a tape (a double-sided tape) is disclosed. The method includes connecting the segments with sections overlapping each other at joints so that gaps are less likely to be created.

The solution in the above publication may not be sufficient and a foreign substance may enter the liquid crystal display device. The tape has a larger thickness to have the cushioning properties. As illustrated in FIGS. 6 and 7, a gap 991G is more likely to be created around an overlapping section as the thickness of the tape increases due a step. The display device in the above publication may require a recess in the frame to compensate for the thickness of the overlapping section of the segment.

SUMMARY

The technology described herein was made in view of the above circumstances. An object is to properly block entries of foreign substances into a display device.

A display device to be set in a position at an angle to a horizontal plane includes a display pane, a frame, and a tape. The display panel is configured to display images. The frame includes a frame portion surrounding a display area of the display panel. The tape is disposed between the display panel and the frame portion. The tape includes segments disposed along the frame portion. The segments include a lower segment extending along a lower section of the frame portion including end portions bending toward an upper section of the frame portion when the display device set at the angle to the horizontal plane.

According to the technology described herein, entries of foreign substances into a display device can be properly blocked.

DETAILED DESCRIPTION

First Embodiment

Figure 1:
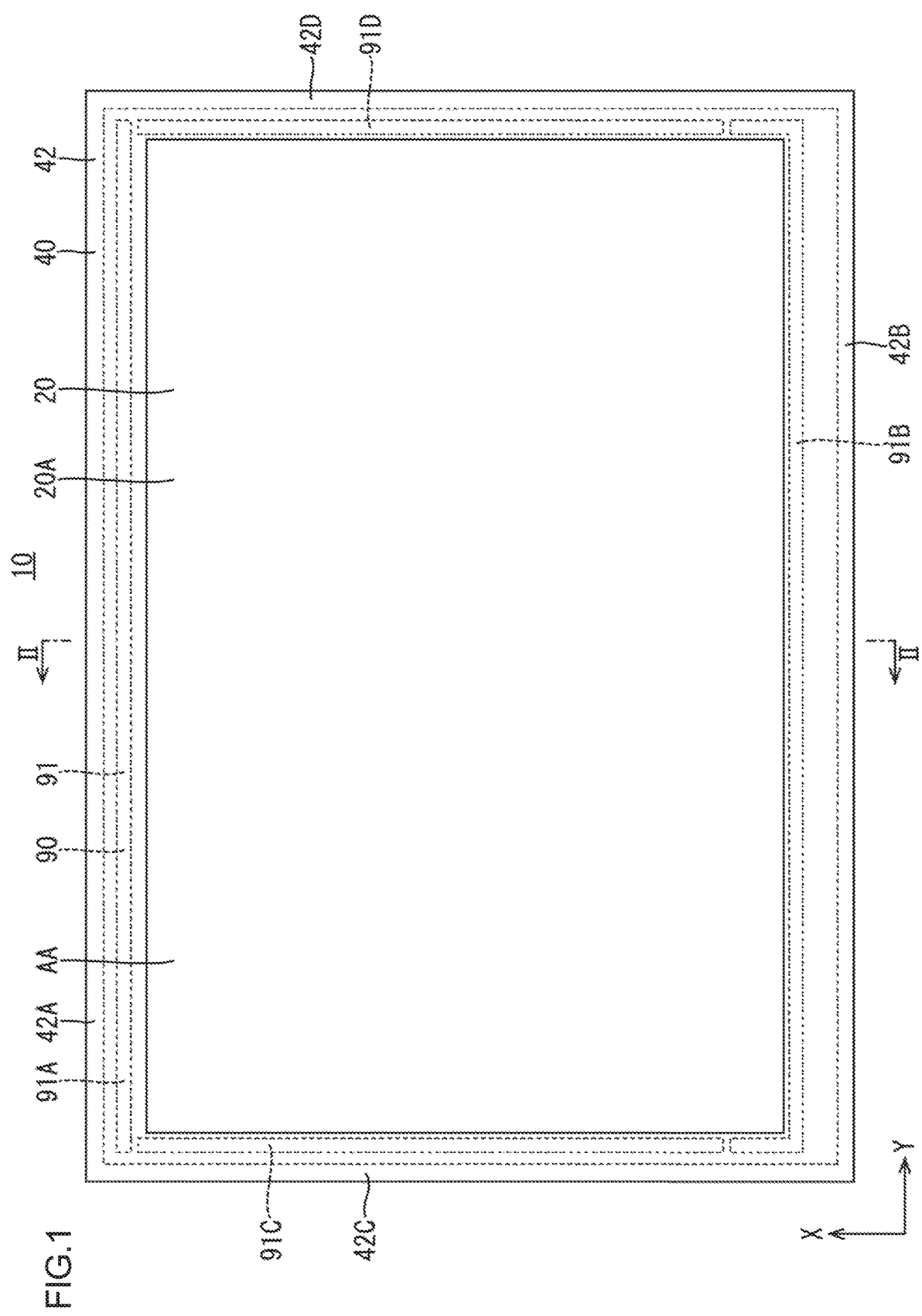
FIG. 1 is a plan view of a liquid crystal display device according to a first embodiment.

A first embodiment will be described with reference to FIGS. 1 to 4. In this section, a liquid crystal display device 10 (a display device) will be described. The X axes, the Y axes, and the Z axes may be present in the drawings. The axes in each drawing correspond to the respective axes in other drawings to indicate trite respective directions. The X-axis direction, the Y-axis direction, and the Z-axis direction correspond with a top-bottom direction, the right-left direction, and the front-rear direction of the liquid crystal display device 10, respectively (a liquid crystal panel 20 side is defined as a front side, a backlight unit 30 side is defined as a rear side).

Figure 2:
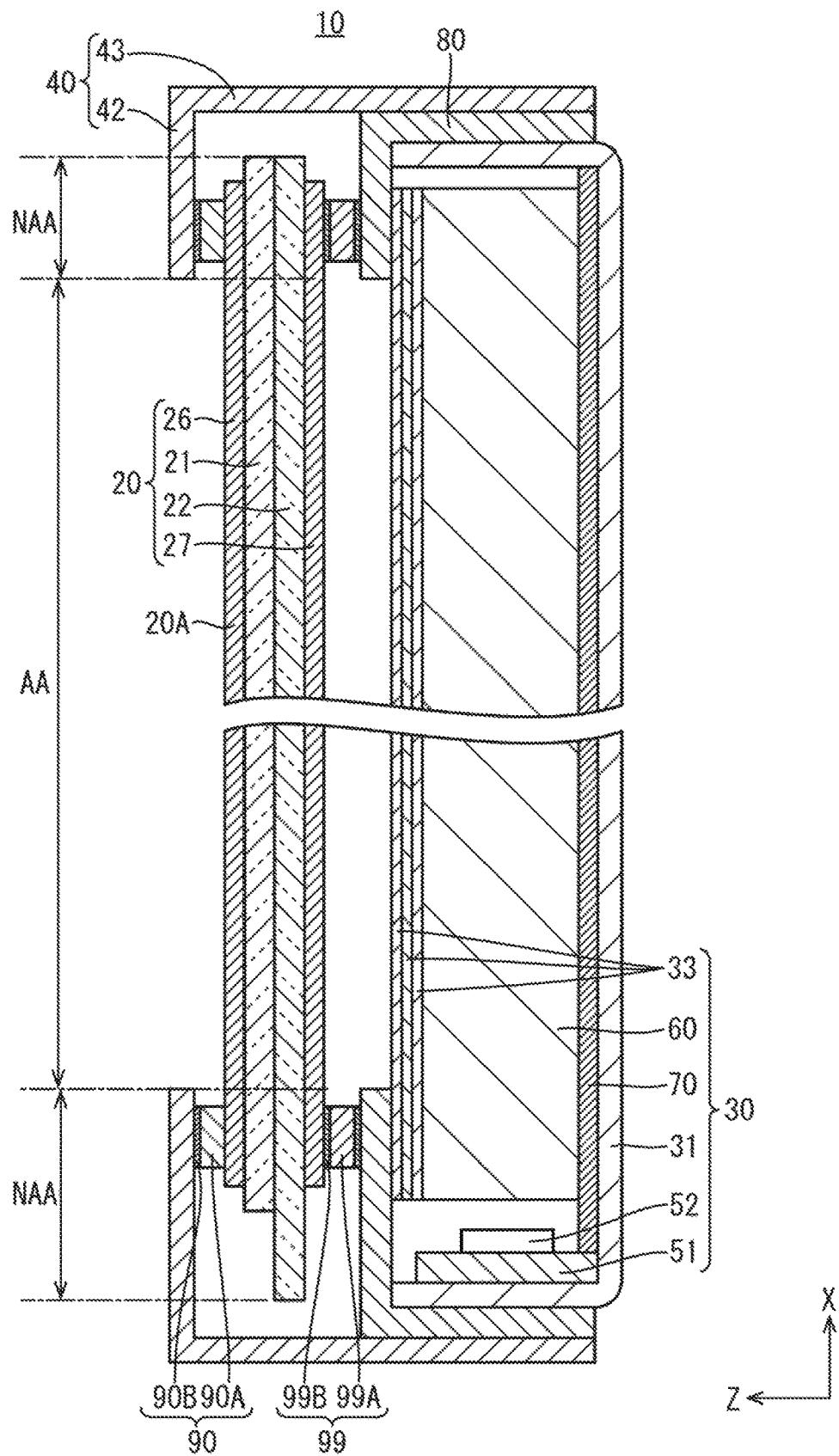
FIG. 2 is a cross-sectional view along line II-II in FIG. 1.

As illustrated in FIG. 1, the liquid crystal display device 10 has a rectangular shape in a plan view and a screen size of about 5 inches or larger. The liquid crystal display device 10 is set in an upright position perpendicular to the horizontal plane (the Y-Z plane in FIG. 4) when it is used. As illustrated in FIG. 2, the liquid crystal display device 10 includes a liquid crystal panel 20 (an example of a display panel), a backlight unit 30 (an example of a lighting device), a bezel 40, and a frame 80. The liquid crystal panel 20 is for displaying images. The backlight unit 30 is disposed behind the liquid crystal panel 20 and configured to apply light to the liquid crystal panel 20. The bezel 40 and frame 80 are components having frame shapes. The liquid crystal panel 20 and the backlight unit 30 are held together by the bezel 40 and the frame 80. The liquid crystal panel 20 is set in a position with a display surface 20A facing a front side (an outer side). The display surface 20A is configured such that images are displayed thereon.

As illustrated in FIG. 2, the liquid crystal panel 20 includes a first glass substrate 21 and a second glass substrate 22 that are transparent and bonded together with a predefined gap therebetween and a liquid crystal layer sealed between the glass substrates. On the first glass substrate 21, switching components (e.g., TFTs), pixel electrodes, and an alignment film are disposed. On the second glass substrate, color filters, a common electrode, and an alignment film are disposed. The color filters include red (R), green (G), and blue (B) color portions that are arranged in a predefined pattern. Polarizing plates 26 and 27 are bonded to outer surfaces of the glass substrates 21 and 22, respectively. The surface of the liquid crystal panel 20 includes a display area (an active area) AA and a non-display area (a non-active area) NAA. The display area AA in which images are displayed is located in the middle. The non-display area NAA has a frame shape in a plan view to surround the display area AA.

As illustrated in FIG. 2, the backlight unit 30 includes a chassis 31, LEDs 52, an LED substrate 51, a light guide plate 60, and an optical sheet 33, and a reflection sheet 70. The chassis 31 has a box shape with an opening on the front side (the light exiting side, the liquid crystal panel 20 side). The LEDs 52 are light sources and mounted on the LED substrate 51. The light guide plate 60 has a plate shape and receives light from the LEDs 52. The optical sheet 33 is configured to exert specific optical effects on the light from the light guide plate 60. The reflection sheet 70 reflects leakage light toward the light guide plate 60. The LEDs 52, the LED substrate 51, the lightguide plate 60, the optical sheet 33, and the reflection sheet 70 are held inside the chassis 31. The backlight unit 30 is an edge-lit (a side-lit) backlight. The LEDs 52 are disposed behind an edge section of the liquid crystal panel 20. Light rays from the LEDs 52 are guided toward the liquid crystal panel 20 by the light guide plate 60 to form planar light.

As illustrated in FIGS. 1 and 2, the bezel 40 extends along outer edges of the liquid crystal panel 20 on a display surface 20A side to form a portion of a front aspect of the liquid crystal display device 10. The bezel 40 is made of resin or metal. The bezel 40 includes a frame portion 42 and side portions 43. The frame portion 42 surrounds the display area AA of the liquid crystal panel 20. The side portions 43 project from outer edges of the frame portion 42 toward the rear side. The frame 80 is made of resin or metal. As illustrated in FIG. 2, the frame 80 extends along the outer edges of the liquid crystal panel 20 on the rear side. The frame 80 and the bezel 40 sandwich the liquid crystal panel 20. In this embodiment, the display area AA of the liquid crystal panel 20 has a rectangular shape and the frame portion 42 has a rectangular shape along the display area AA. However, the shapes of the display area AA and the frame portion 42 are not limited to the rectangular shapes and may be altered according to requirements.

As illustrated in FIG. 2, a tape 90 is disposed between the liquid crystal panel 20 and the bezel 40 and a tape 99 is disposed between the liquid crystal panel 20 and the frame 80. The tape 90 may include a base 90A and an adhesive layer 90B. The tape 99 may include a base 99A and an adhesive layer 99B. The bases 90A and 99A are cushioning members made of a material having cushioning properties such as urethane to absorb impacts. The adhesive layers 90B and 99B are applied or stacked on front and/or back surfaces of the bases 90A and 99A to bond the tapes 90 and 99 to other components (the liquid crystal panel 20, the bezel 40, the frame 80).

Figure 3:
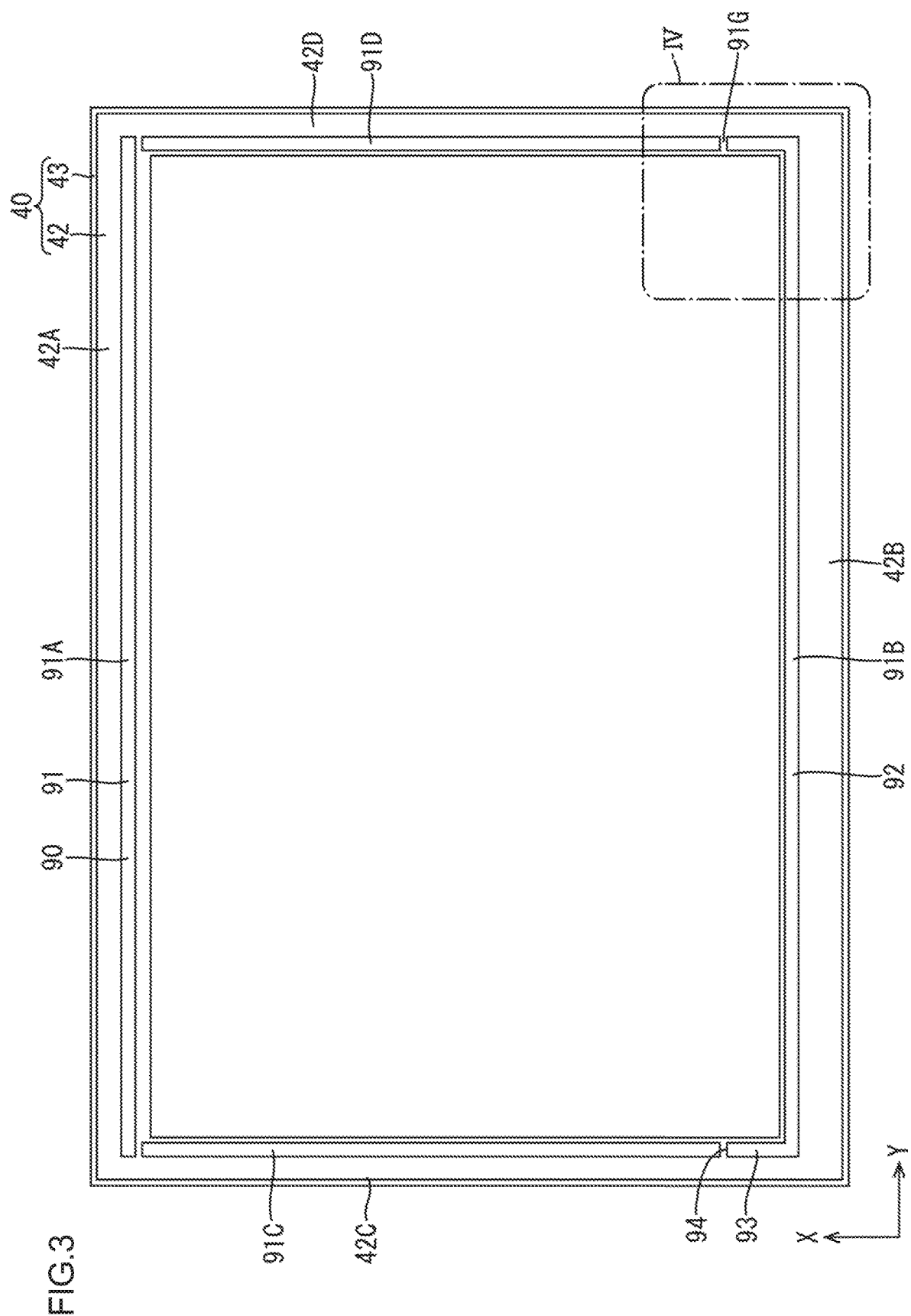
FIG. 3 is a back view of a bezel with a tape bonded to a back surface of the bezel.

As illustrated in FIG. 3, the tape 90 disposed between the liquid crystal panel 20 and the bezel 40 includes segments 91A, 91B, 91C, and 91D disposed along the frame portion 42 of the bezel 40. The segments 91A, 91B, 91C, and 91D are connected to form a frame shape. The segments 91A, 91B, 91C, and 91D are disposed along an upper section 42A, a lower section 42B, a left section 42C, and a right section 42D of the frame portion 42 having the rectangular shape, respectively. The tape 90 that includes the segments 91A, 91B, 91C, and 91D connected to each other can be prepared at lower production cost in comparison to a tape prepared from a single piece of material. However, gaps 91G may be created at joints among the segments 91A, 91B, 91C, and 91D regardless of connecting methods which may include a manually connecting method and a machine connecting method. Hereinafter, the segments 91A, 91B, 91C, and 91D may be referred to as the segments 91 for describing common configurations.

As illustrated in FIG. 3, the segment 91B that extends along the lower section 42B of the frame portion 42 has a U shape in a plan view. End portions of the segment 91B with respect to an extending direction thereof (the Y-axis direction) bend upward toward the upper section 42A of the frame portion 42. In FIG. 3, the end portions of the segment 91B are bent toward the upper section 42A of the frame portion 42; however, the end portions may be curved. The segment 91B includes a body 92 and extending portions 93. The body 92 extends linearly. The extending portions 93 extend from the body 92 and bend toward the upper section 42A of the frame portion 42. The extending portions 93 are integrally formed with the body 92 to bend relative to the body 92. The extending portions 93 may be integrally formed with the body 92 without bending relative to the body 92 and then the extending portion 93 are bent and bonded to the frame portion 42. According to the configuration in which the extending portions 93 are integrally formed with the body 92, the production process can be simplified and the extending portions 93 are less likely to be removed from the body 92.

Figure 4:
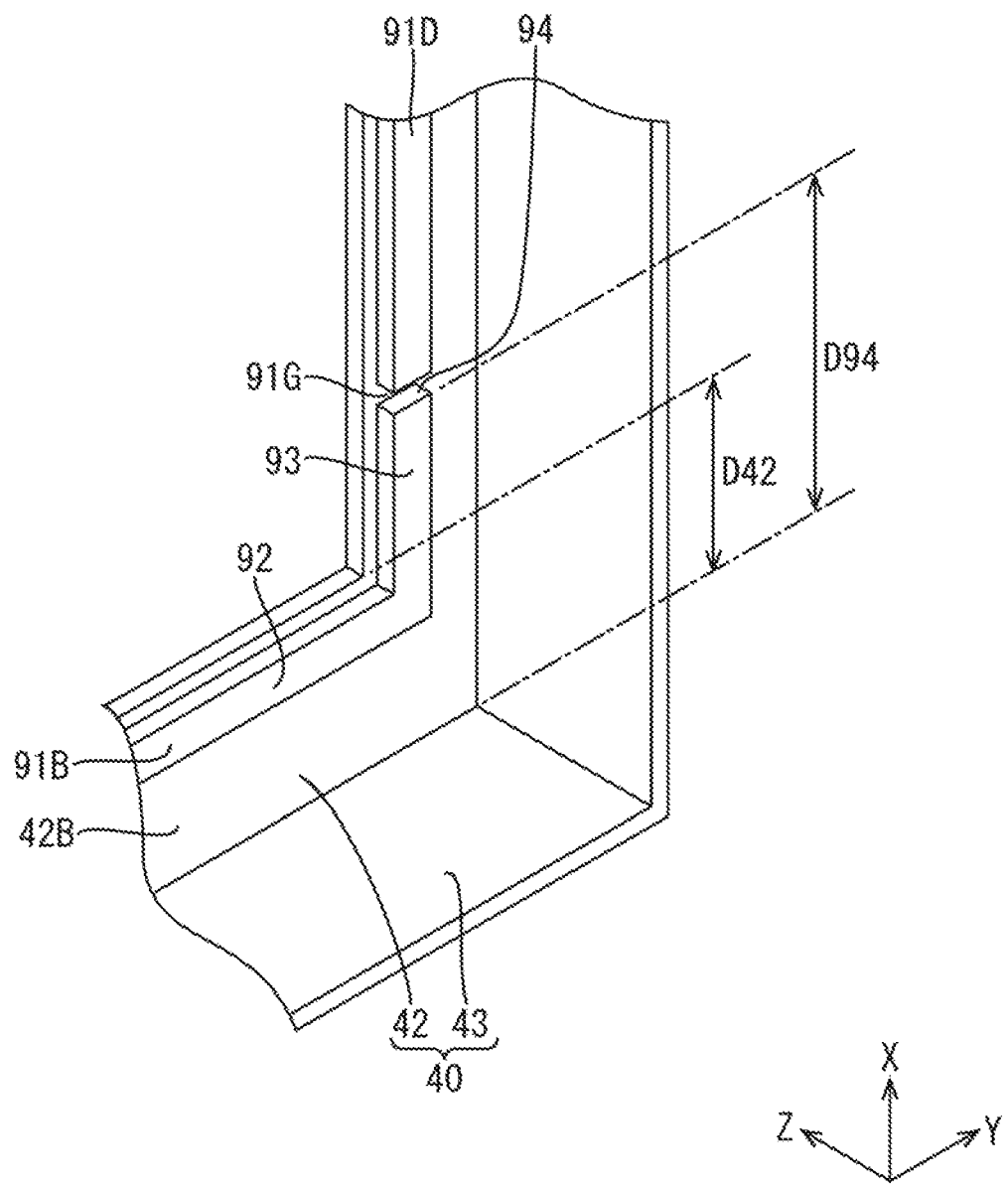
FIG. 4 is a perspective view of a section surrounded by chain line IV-IV in FIG. 3.

As illustrated in FIGS. 3 and 4, distal ends 94 of the extending portions 93 on the right and the left axe located above an upper edge of the lower section 42B of the frame portion on 42. Specifically, when a distance between the lower edge and the upper edge of the lower section 42 of the frame portion 42 is defined as D42 and a distance between the lower edge of the lower section 42B of the frame portion 42 and the distal end 94 is defined as D94, they have the following relation: D94>D42. The distance D94 between the lower edge of the lower section 42B and the distal end 94 on the right may be different from the distance D93 between the lower edge of the lower section 42B and the distal end 94 on the left. The distance D94 may be defined within a range that satisfies the above relation.

As described above, the liquid crystal display device 10 according to this embodiment is set in the upright position perpendicular to the horizontal plane. The liquid crystal display device 10 includes the liquid crystal panel 20, the bezel 40, and the tape 90. The liquid crystal panel 20 is configured to display images. The bezel 40 includes the frame portion that surrounds the display area AA of the liquid crystal panel 20. The tape 90 is disposed between the liquid crystal panel 20 and the frame portion 42. The tape 90 includes the segments 91 disposed along the frame portion 42. When the liquid crystal display device 10 is set in the upright position, the ends of the segment 91B that extends along the lower section 42B of the frame portion 42 are bent toward the upper section 42A of the frame portion 42.

If a liquid adheres to the liquid crystal panel 20, the liquid may flow down on the surface of the liquid crystal panel 20 due to the gravity and reach the segment 91B that extends along the lower section 42B of the frame portion 42. Because the end portions of the segment 91B are bent toward the upper section 42A of the frame portion 42, the liquid that has reached the segment 91B is more likely to remain in an area other than the ends of the segment 91B and less likely to reach the ends. According to the configuration, liquids are less likely to reach the gaps 91G at the distal ends 94 of the extending portions 93. The liquids are less likely to enter into the inside of the liquid crystal display device 10 through the gaps 91G.

The frame portion 42 is disposed on the display surface 20A side of the liquid crystal panel 20. The distal ends 94 of the extending portions 93 of the segment 91B that extends along the lower section 42B of the frame portion 42 are located above the upper edge of the lower section 42B of the frame portion 42. According to the configuration, liquids that have reached the segment 91B flow to outer sides relative to the display surface 20A (on the front side of the frame portion 42). With such flow passages, the liquids are further less likely to reach the end portions of the segment 91B.

The segment 91B includes the body 92 and the extending portion 93. The body 92 extends linearly. The extending portions 93 extend from the body 92 and bend toward the upper section 42A of the frame portion 42. The body 92 is disposed below the upper edge of the lower section 42B of the frame portion 42 so that the segment 91B is less likely to be recognized from the outer side. Furthermore, a liquid that has reached the segment 91B is more likely to remain at the body 92 and less likely to reach the end portions.

To verify the functions and the effect described above, an experiment was conducted using nine samples having the same configuration in conformity with ISO 20653 standards. According to the results of the experiment, no entry of water was confirmed in all the samples after water was kept running on the display surface 20A of the liquid crystal panel 20 for ten minutes. Further, no problems were found in operation and display quality of the liquid crystal display device 10. No water was found in areas outer than the tape 90 (on the outer edge side) after two hours and twelve hours since the water was stopped. Namely, the entry of water through the through the gaps 91G between the segments 91 of the tape 90 was properly blocked.

Figure 5:
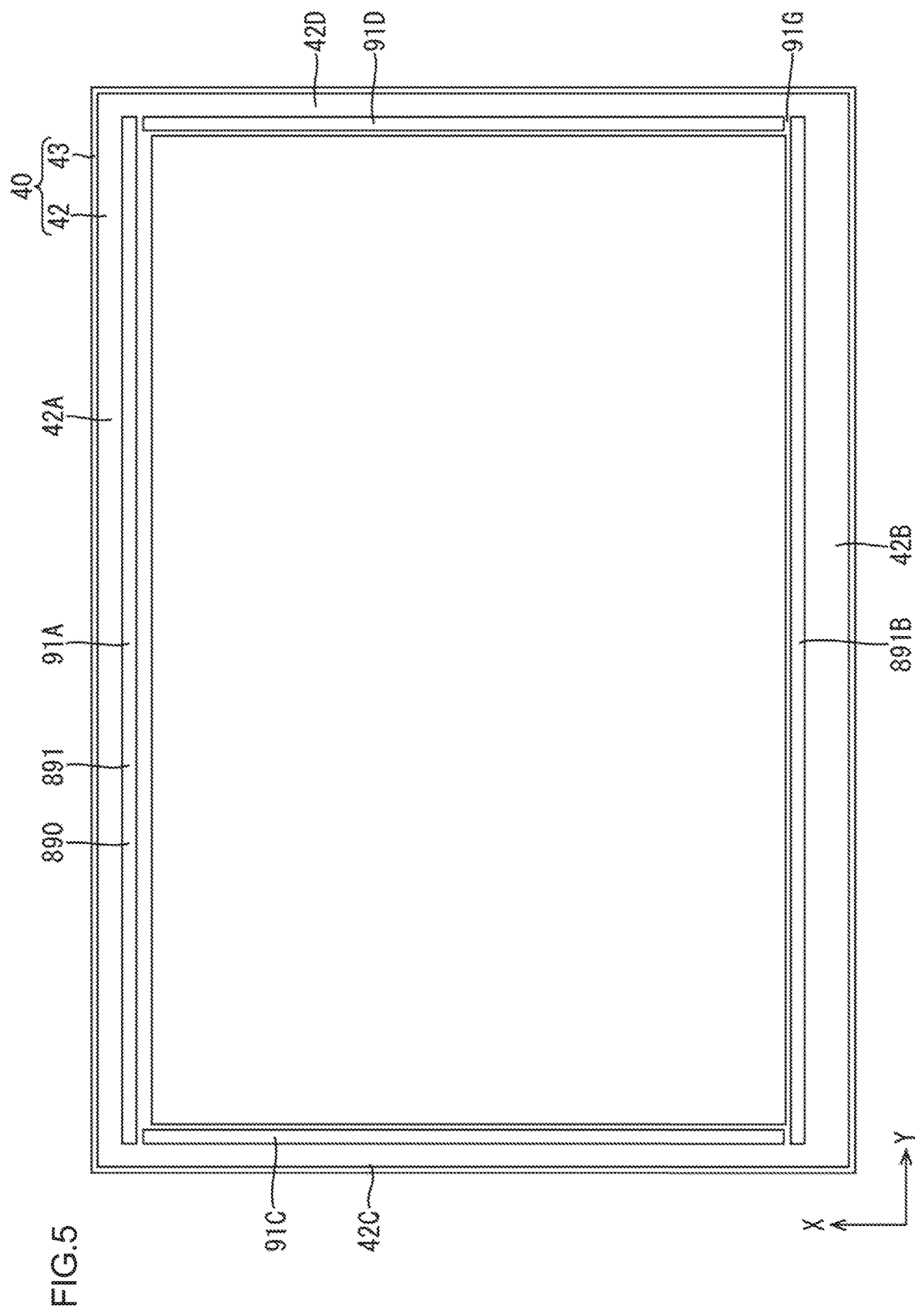
FIG. 5 is a back view of a bezel with a tape bonded to a back surface of the bezel according to a first comparative example.

A tap 890 according to comparative example 1 illustrated in FIG. 5 includes a segment 891B that extends along the lower section 42B of the frame portion 42. End portions of the segment 891B are not bent toward the upper section 42A of the frame portion 42. According to the configuration, a liquid that has reached the segment 891B may reach the end portions of the segment 891B and the gaps 91G. Therefore, the liquid may enter into an inside of a liquid crystal display device.

Figure 6:
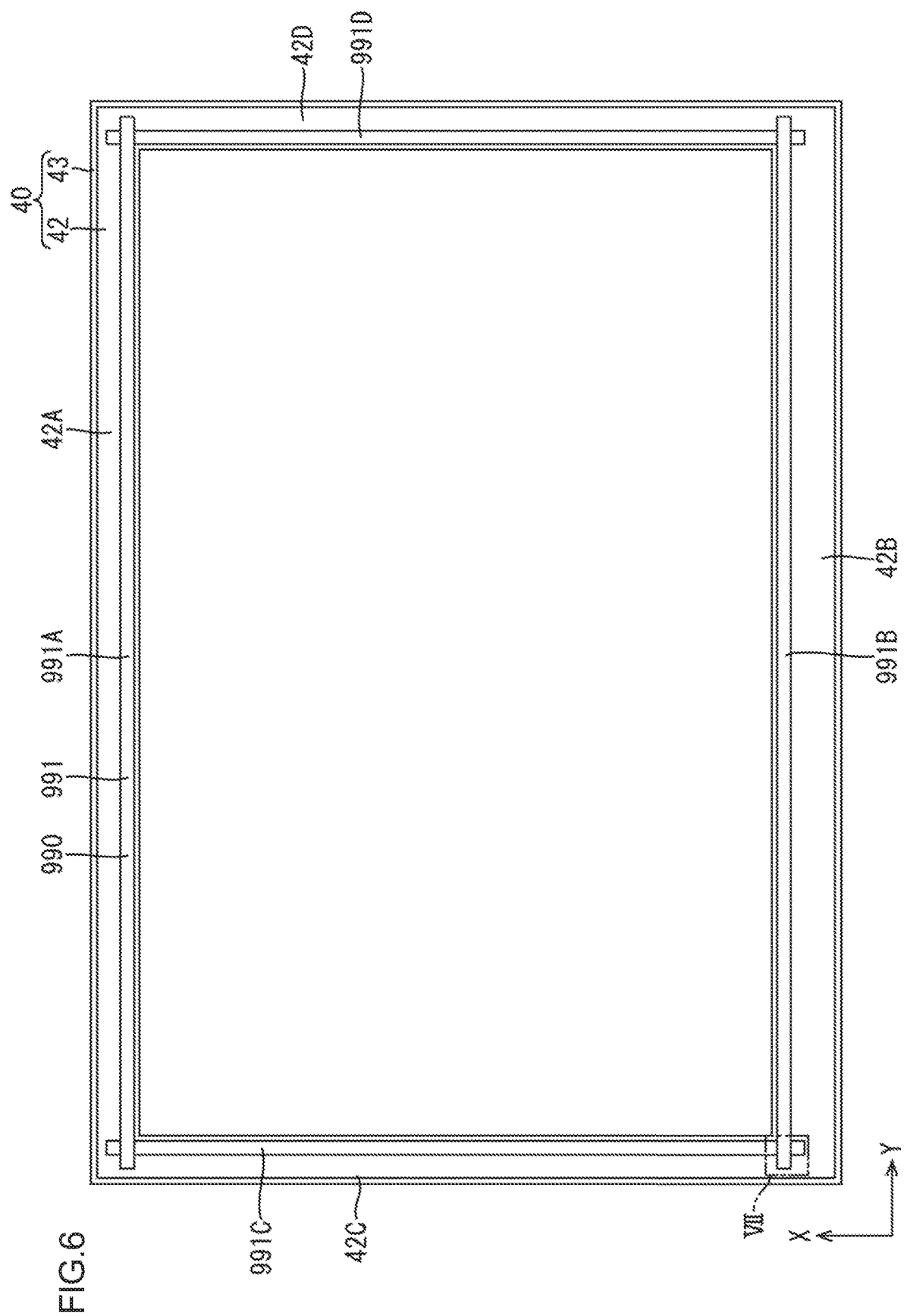
FIG. 6 is a back view of a bezel with a tape bonded to a back surface of the bezel according to a second comparative example.
Figure 7:
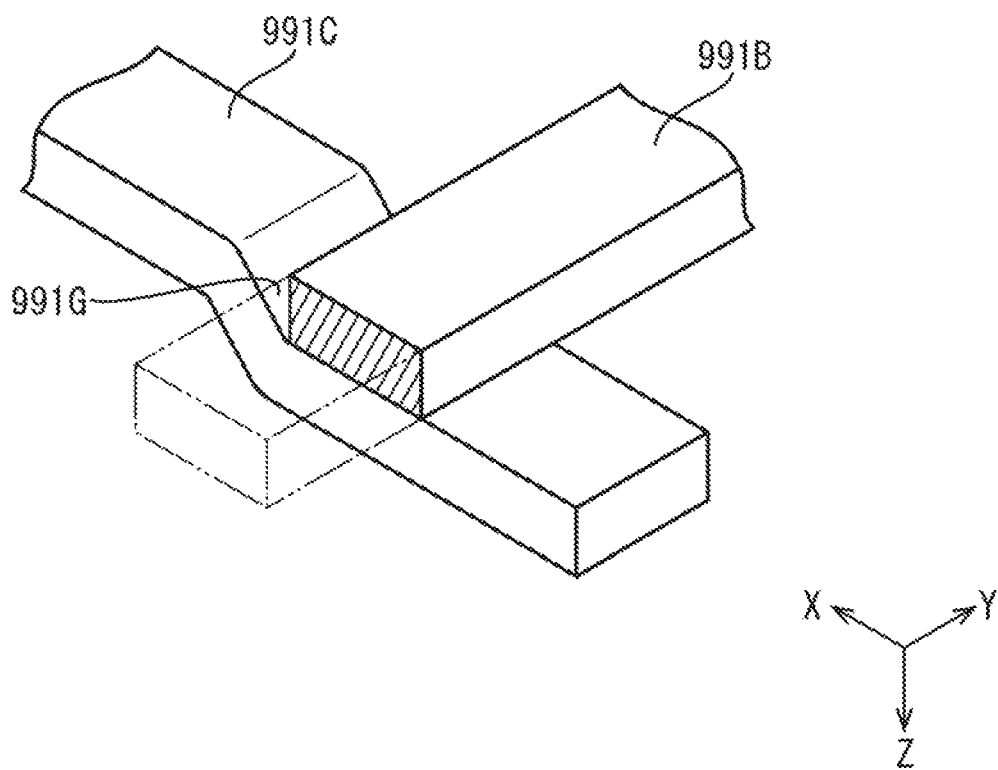
FIG. 7 is a perspective view of a section surrounded by chain line VII-VII in FIG. 6.

A tape 990 according to comparative example 2 illustrated in FIG. 6 includes segments 991A, 991B, 991C, and 991D that extend linearly to cross each other at joints. According to the configuration, gaps 991G are created around the joints because of steps. In FIG. 7, a section of the segment 991B is illustrated by chain lines to clearly show the gap 991G. It is preferable that the tape 990 is provided in a certain thickness to have cushioning properties. However, the gap 991G increases as the thickness of the tape 990 increases. Further, each step at each joint increases as the thickness of the tape 990 increases. Therefore, modifications to the bezel 40, for example, forming of recesses may be required for compensating the steps. According to this embodiment, entry of foreign substances at the joints (through the gaps 91G) between the segments 91 of the tape 90 can be properly blocked.

OTHER EMBODIMENTS

The technology described herein is not limited to the embodiments described above and with reference to the drawings. The following embodiments may be included in the technical scope.

(1) The liquid crystal display device 10 may be set at an angle to the horizontal plane other than the right angle.

(2) The number of the segments of the tape is not limited to four as long as the segments are disposed along the frame portion.

(3) The technology described herein may be applied to a tape disposed between the liquid crystal panel and a frame.

(4) The technology described herein may be applied to a liquid crystal panel configured to operate in a mode other than the VA mode, such as an in-plane switching (IPS) mode.

(5) The technology described herein may be applied to other types of lighting devices such as an edge-lit backlight including double light entering surfaces and a direct backlight.

(6) The technology described herein may be applied to other types of display panels (organic EL panels, plasma display panels, electrophoretic display panels, micro electro mechanical systems display panels).

The invention claimed is:

1. A display device to be set in a position at an angle to a horizontal plane, the display device comprising:
    a display panel configured to display images;
    a frame including a frame portion surrounding a display area of the display panel; and
    a tape disposed between the display panel and the frame portion, the tape including segments disposed along the frame portion, the segments including a lower segment extending along a lower section of the frame portion including end portions bending toward an upper section of the frame portion when the display device is set at the angle to the horizontal plane, wherein
    the frame portion is disposed on a display surface side of the display panel, and
    the end portions include distal ends disposed above an upper edge of the lower section of the frame portion.

2. The display device according to claim 1, wherein the lower segment includes:
    a body extending linearly; and
    an extending portion extending from the body and bend toward an upper section of the frame portion.

3. The display device according to claim 2, wherein the extending portion is integrally provided with the body.

4. The display device according to claim 2, wherein the body is disposed below an upper edge of the lower section of the frame portion.

5. The display device according to claim 1, wherein the tape includes a base having a cushioning property.

6. The display device according to claim 1, wherein the display panel is a liquid crystal panel.

* * * * *